United States Patent [15] 3,654,722
Camilleri [45] Apr. 11, 1972

[54] FISH LINE HOLDER
[72] Inventor: Francis P. Camilleri, 30 West Street, Rocky Hill, Conn. 06067
[22] Filed: Feb. 9, 1970
[21] Appl. No.: 9,564

[52] U.S. Cl. ........................................................... 43/25
[51] Int. Cl. ....................................................... A01k 87/00
[58] Field of Search .................... 43/25, 25.2, 18, 19, 43.12, 43/44.95, 42.04

[56] References Cited
UNITED STATES PATENTS
3,256,633  3/1971  Smith ........................................... 43/25

*Primary Examiner*—Warner H. Camp
*Attorney*—McCormick, Paulding & Huber

[57] ABSTRACT

The device includes a housing with means for mounting the same to the pole generally opposite the reel and includes an L-shaped extension at one end defining a slot, or cavity, located on the opposite side of the pole from the reel. A ball element is slidably supported in the housing for movement from and to a position closing off the cavity, and a pair of compression springs are provided in series inside the housing for urging the ball element toward its closed position with a force which can be adjusted within two distinct ranges as a result of the double spring configuration disclosed herein.

6 Claims, 4 Drawing Figures

PATENTED APR 11 1972   3,654,722
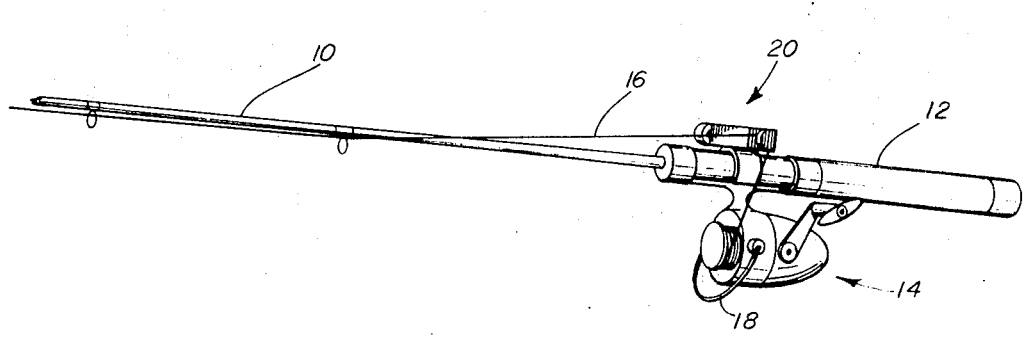
Fig. 1
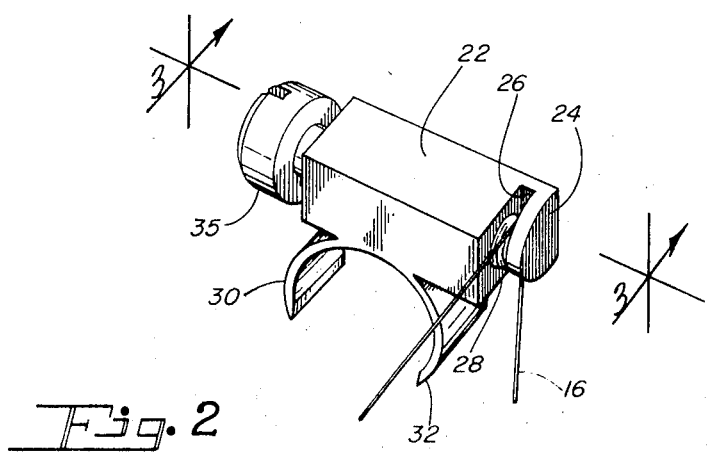
Fig. 2
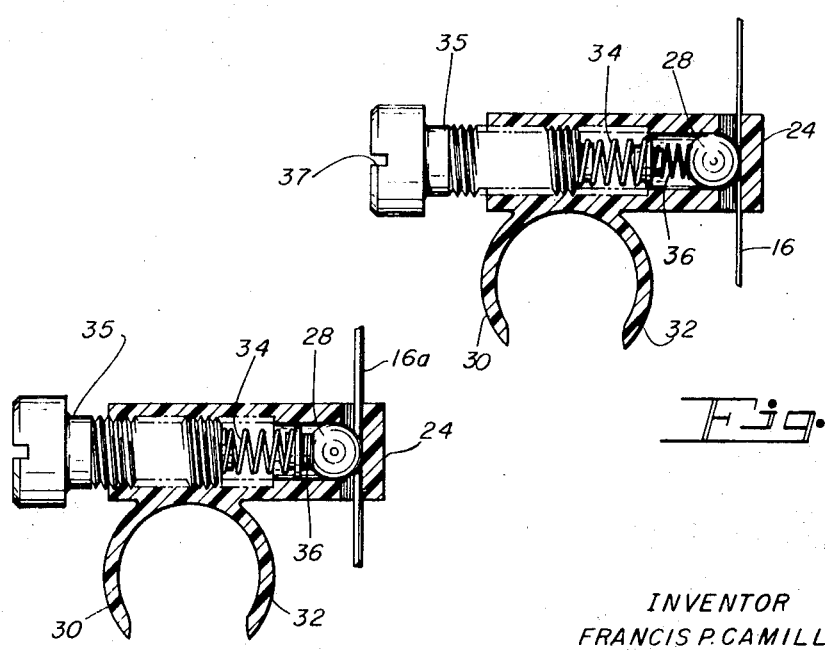
Fig. 3A
Fig. 3B
INVENTOR
FRANCIS P. CAMILLERI
BY McCormick, Paulding & Huber
Attorneys

FISH LINE HOLDER

BACKGROUND OF THE INVENTION

The present invention relates to devices for use on fishing poles of the type equipped with casting reels, and deals more particularly with a device which is most useful after the cast, while the angler is waiting for a strike.

Various devices have been proposed heretofore for aiding the fisherman during the casting operation. For example, U.S. Pat. No. 3,057,106 issued to Wheeler shows a device for restraining the line during a portion of cast, which device is activated in response to deceleration of the fishing pole or rod. U.S. Pat. No. 3,256,633 issued to Smith shows a device which saves the angler the trouble of utilizing his forefinger on the line during the cast, a lever being provided for this purpose.

The foregoing patents all relate to devices for restraining the fishing line, especially during the casting operation. The present invention, on the other hand, relates to a fish line holder especially adapted for use once the line has been cast, and allows the angler to let his bail remain in its open condition so that the line can be readily paid-out in the event of a strike.

A major problem that anglers face, once a fish strikes, is the absence of slack with the bail on the reel closed to to actuate the reel's drag feature. A fish strikes, feels the pressure caused by the drag, and may spit out the bait.

The angler can hold his pole with the bail open but must manually control the line in order to be able to release the line when a fish strikes to allow the fish to run with the bait.

A general object of the present invention is to provide a device for holding the line while the bail is left open, as is normally done, but which device will automatically release the line allowing it to pay off the reel when the fish strikes.

A general object of the present invention is to provide a fish line holder for a rod and reel combination wherein the fisherman may leave his apparatus unattended while waiting for a strike, the subject device being capable of releasing the line at some predetermined tension to allow the fish to carry the line from his reel, while at the same time preventing inadvertent paying out of the line from the reel, as for example has occurred heretofore when the bail is left open and the fisherman's rod and reel left unattended.

SUMMARY OF THE INVENTION

The device disclosed herein is intended for use in combination with a rod and reel combination of the conventional variety, and relates to a housing for installation on the fishing pole adjacent the handle end thereof, and in diametrically opposed relationship to the reel. The housing includes an L-shaped extension defining a slot or cavity located to one side of the pole, when the device is so installed, and a ball element slidably supported in the housing is adapted for movement from and to a position closing off said cavity. Two coil springs located in series in the housing are adapted to urge the ball element toward its closed position, and an adjusting screw threadably received in the housing, opposite the L-shaped extension, permits adjustment of the restraining force exerted by the ball element on the fishing line. The double coil spring construction permits adjustments to be made in two distinct ranges as a result of the series configuration for the two springs. One spring has a lighter spring force than the other and both are arranged in end-toward-end relationship to provide two distinct ranges of restraining force.

BRIEF DESCRIPTION OF THE DRAWING

FIG. 1 is a perspective view of the handle portion of a fishing pole or rod, with a conventional casting reel mounted thereto, and with the bail of the reel being located in its open or unfolded position. A device of the present invention is shown mounted on the handle portion of the pole in generally opposed relationship to the reel, and the fishing line is shown restrained by the device as would be the case while the fisherman is waiting for a strike.

FIG. 2 is a perspective view of the device shown mounted to the fishing pole in FIG. 1.

FIG. 3a is a sectional view taken on the line 3—3 of FIG. 2 and shows the adjusting screw in a position for exerting a light force on the fishing line.

FIG. 3b is a view similar to FIG. 3a and shows the adjusting screw in a position for exerting a larger force on a fishing line which line may be of somewhat greater diameter than that shown in FIG. 3a. In FIG. 3b one of the two coil springs in the housing is shown in its fully compressed condition.

DETAILED DESCRIPTION

Turning now to the drawings in greater detail, FIG. 1 shows a rod and reel combination, including a pole 10 with an associated handle 12 on which is mounted a conventional casting reel 14, although the reel shown is of the fresh water variety, a salt water reel might also be used with the subject device within the scope of the present invention. The fishing line 16 is stored on a conventional portion of the reel 14, and the bail 18 is shown in its open condition, that is folded downwardly to allow the line 16 to be paid-off the reel in the event that a fish strikes the bait (not shown) but conventionally provided at the free end of the line 16. As shown, the fishing line 16 is restrained by the subject device 20 so that in spite of the bail 18 being open the line is not free to pay out unless a tension force above some predetermined level is exerted on the line.

FIG. 2 shows the subject device 20 drawn to a somewhat larger scale than in FIG. 1. The device comprises an injection molded plastic housing 22 of generally rectangular configuration, and with an integrally formed L-shaped extension 24 at one end defining a forwardly facing and upwardly and downwardly open cavity, or slot 26, in which the line 16 is adapted to be releasably retained by a spring loaded ball element 28. As best shown in FIG. 2, the housing 22 is mounted on the fishing pole, and more particularly on the handle portion 12 thereof in generally opposite relation to the reel 14, and further, the L-shaped extension 24 is located to one side of the pole so as to conveniently receive the upwardly extending fishing line 16 without interference with the handle 12, or the reel 14 and its supporting structure. Still with reference to FIG. 2, the housing 22 can be seen to include integrally formed pole, or handle gripping legs 30 and 32, which are resilient enough to snap over the handle portion 12 of the fishing pole, and which are formed from the same resilient thermoplastic material as that from which the housing 22 is molded.

Biasing means is provided for urging the ball element 28 toward the right-hand end of the housing 22 in FIGS. 3a and 3b, said biasing means comprises a plurality of coil compression springs having differing spring constants whereby distinct ranges of restraining force are obtainable depending upon the configuration of the lighter of the two springs shown. For example, FIG. 3a shows two coil springs 34 and 36 arranged in a mechanical series circuit between the inner end of a screw member 35 and the ball element 28 so as to urge the latter toward the right-hand end of the housing 22 and against the L-shaped extension 24. As so arranged the ball element 28 restrains the fishing line 16 in its associated cavity. The force exerted on the ball element 28 can be seen from FIG. 3a to be related to the force exerted by the lighter spring 36, and it will also be apparent that the adjusting screw 35 can be turned, as for example, by a screwdriver or other tool placed in the slot 37 to adjust, within a predetermined range, the retaining force exerted by the ball element 28 on the fishing line 16. The spring element 34 in the configuration shown in FIG. 3a has little effect on the force exerted on the fishing line. Considering next the configuration of the springs 34 and 36 shown in FIG. 3b, the adjusting screw 35 has been turned several revolutions so as to compress the lighter spring 36 and hence the heavier spring 34 takes over in determining the net force exerted by the ball element 28 on the L-shaped extension 24.

Thus, at least two distinct ranges of line restraining force can be achieved with the subject device.

Thus, the mechanical series arrangement of the springs 34 and 36 is especially suitable for use in restraining a wide range of fishing lines. For example, if a fish strikes at the lure or bait on the line 16a of FIG. 3b a somewhat larger force is required to dislodge the line 16a from the holding device 20 as compared to the line 16 of FIG. 3a. It will also be apparent that depending upon the axial position of the adjusting screw 35 and hence depending upon the displacement exerted by the adjusting screw 35 on the spring 34 two distinct ranges of forces are obtainable, which force ranges differ considerably from one another.

The adjusting screw 35 is preferably fabricated from a thermoplastic material so as to be very resistant to corrosion or the like, and is threadably received in the opposite end of the housing 22 from the L-shaped extension 24. While a slot 37 is provided in the adjusting screw 35 it will be apparent that a knurled head might be provided and would be equally well suited for the intended purpose, namely in determining not only the range of forces desired between the ball element 28 and the L-shaped extension 24, but also the precise force desired within that range.

By way of summary, the device 20 described herein is especially well adapted for use on a casting rod either of the fresh water variety such as that shown, or on a salt water reel of well known configuration. Thus, the device of the present invention is intended for use with a fishing rod and reel wherein the line must be free to pay out when the force exceeds some predetermined level. Heretofore the line has frequently been restrained by the fisherman after he has made his cast in some rudimentary fashion as for example by laying a stone or other object on the line so that the fisherman does not have to actually hold his rod while waiting for a strike. With a device of the present invention, the fisherman merely places the line past the spring loaded ball element 28, to the position shown in FIG. 1, and then he merely tests the tension required to withdraw the line from the cavity 26 and if any change in restraining force is required he simply rotates the screw 35 until the restraining force meets his satisfaction. Then, when a fish strikes the line, the line will be withdrawn from its cavity if a force exceeding the predetermined force is exerted thereon by the fish. When this occurs an audible click will be heard by the fisherman and he can immediately resume the normal procedures for utilizing a rod and reel combination of the type shown. In short, he need only pick up the rod and grasp the crank provided on the reel for this purpose and attempt to reel in his catch.

I claim:

1. In combination, a fishing pole including aligned eyelets for loosely receiving a fish line, a reel carried by the pole and including bail means for holding the line when in one position and for allowing the said line to be paid out from the reel when in its second position, a housing mounted on the pole generally opposite said reel and including an L-shaped extension defining a cavity located to one side of said pole, an element slidably supported in said housing for movement from and to a position closing off said cavity, biasing means in said housing for urging said element toward its closed position whereby the line can be placed in said cavity and prevented from paying out when said bail is in its second position except when the force on the line exceeds some predetermined level.

2. The combination defined in claim 1 and further characterized by means for adjusting the level of the restraining force exerted on the line by said biasing means.

3. The combination defined in claim 2 wherein said biasing means comprises at least one coil compression spring in said housing, and wherein said means for adjusting said force level comprises a screw threadably received in the end of said housing opposite said L-shaped extension.

4. The combination defined in claim 3 wherein said biasing means comprises a plurality of coil compression springs, all of which springs are arranged in a mechanical series circuit between said element and said force adjusting screw whereby a plurality of ranges of force can be obtained.

5. The combination defined in claim 3 wherein said biasing means comprises two coil compression springs arranged in a mechanical series circuit between said element and said force adjusting screw, one spring having a lighter spring force than the other whereby two distinct ranges of force are obtainable, one with the lighter spring fully compressed and rendered out of the mechanical circuit.

6. The combination defined in claim 5 further characterized by integrally formed pole gripping means on said housing for mounting the housing on the pole, said housing and gripping means being formed from a resilient thermoplastic material to permit said housing to be readily assembled with said pole.

* * * * *